June 3, 1947.  G. A. DALTON  2,421,546
FLEXIBLE COUPLING
Filed March 10, 1944

INVENTOR
George A. Dalton
BY
Kenyon & Kenyon
ATTORNEYS

Patented June 3, 1947

2,421,546

UNITED STATES PATENT OFFICE 2,421,546

FLEXIBLE COUPLING

George A. Dalton, New Brunswick, N. J., assignor to John Waldron Corporation, New Brunswick, N. J., a corporation of New Jersey Application March 10, 1944, Serial No. 525,958

1 Claim. (Cl. 64—9)

This invention relates to flexible couplings and more especially to a flexible coupling of the gear type. Such a coupling consists of two identical externally geared hubs keyed to the shafts to be coupled. The hubs are connected and enclosed by a two-piece internally geared floating cover sleeve. The two pieces of the sleeve are rigidly interconnected so as to function as a single unit. In compensating for shaft misalinement, the cover sleeve generally assumes a neutral position between the hubs.

Heretofore, these couplings have been composed entirely of metal and torque has been transmitted from one sleeve member to the other sleeve member by means of bolts passing through apertures in said sleeve members. The use of bolts has been necessary because of the prohibitive amount of machining that would be required to provide inter-engaging portions integral with the sleeve members. Each hub has been produced from a substantially solid metal forging of an exterior contour conforming generally to the contour of the finished hub. To convert such a forging into a hub has required a great deal of machining of the forging to form the teeth and to provide the desired contour of the finished hub, as well as to provide the central bore to receive the shaft. Each cover piece likewise has been produced from a forging and a considerable amount of machining has been required on it to provide the teeth and bring it to the desired configuration. The labor expense of carrying out the required extensive machining of the hubs and sleeve sections has constituted approximately three-fourths of the cost of the finished coupling.

An object of this invention is a gear coupling which can be constructed without requiring any considerable amount of machining and in which the labor cost expense is reduced to such an extent that the manufacturing cost of the finished coupling is a small fraction of the present cost.

According to this invention, each hub and sleeve section is composed primarily or completely of a thermosetting plastic material. The hub preferably is provided with a metal liner to receive the shaft and has a keyway cut in it. The sleeve sections are provided with inter-engaging portions for transmitting torque from one to the other to effect unitary rotation of said sections. Both the hub and cover section may be molded in a single operation and formed in finished condition during the molding operation without the necessity of machining either of them except for the keyway above mentioned. The liner may have the hub molded directly around it and may consist of suitable tubular metal stock. The inter-engaging portions of the two cover sections are formed during the operation of molding each cover section. Bolts are provided for holding the two cover sections together, but in the operation of the coupling no torque is transmitted through the bolts but the torque is transmitted through the inter-engaging portions previously referred to.

Other objects, novel features and advantages of this invention will become apparent from the following specification and accompanying drawings, wherein.

Figure 1:
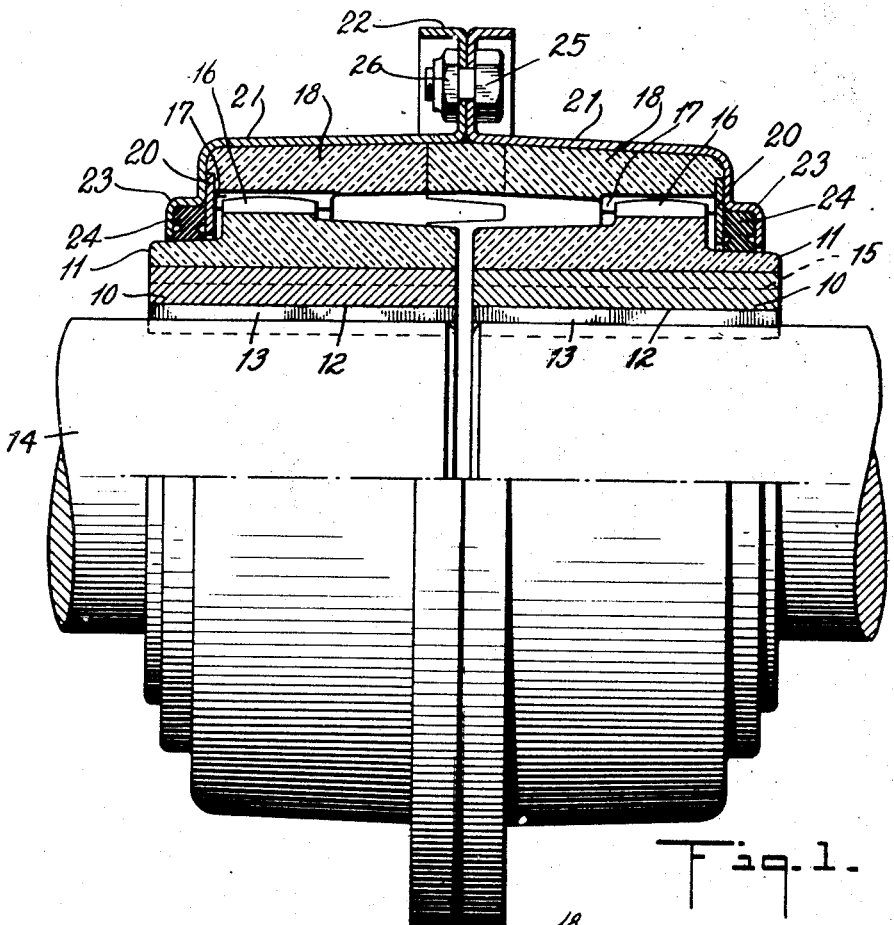
Fig. 1 is an elevation partly in section of an embodiment of the invention.
Figure 2:
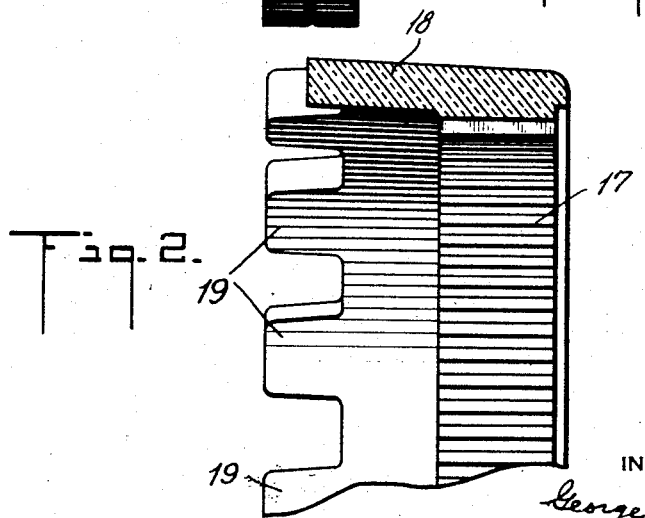
Fig. 2 is an enlarged fragmentary detail of one end of a sleeve section.

The coupling consists of two metal sleeves 10 on each of which is formed a hub 11 of suitable thermosetting plastic material such, for example, as Bakelite. Each sleeve 10 is provided with a keyway 12 to receive a portion of a key 13, the remaining portion of which is received in a keyway in the shaft 14 on which the sleeve 10 is mounted. The outer surface of the sleeve 10 is provided with longitudinal ridges 15 or is otherwise roughened to prevent rotation of the hub 11 on the sleeve 10. Each hub is provided with an external gear 16 which meshes with an internal gear 17 in a sleeve section 18 likewise formed of suitable thermosetting plastic material.

The meeting edges of the sleeve sections 18 are formed with alternating teeth or alternating projections 19 which fit together in torque-transmitting relationship. A flat metal ring 20 is received in a recess at one end of each sleeve section 18 and projects toward a hub 11. A generally cup-shaped metal casing 21 encloses each sleeve section 18 to hold the ring 20 in its recess and is provided with a flange or lip 22. Each casing is provided at the end opposite the flange 22 with an opening of slightly larger diameter receiving the outer end of the hub 11. Each casing member is offset as at 23 to form with the ring 20 a circular groove in which is received a gasket 24 preferably of the construction shown in the U. S. patent to Case, No. 2,271,060. Bolts 25 pass through apertures in the flanges 22 and co-operate with nuts 26 to hold the flanges in contact.

Torque is transmitted from each shaft 14 to the corresponding hub 11 through the key 13 and sleeve 10 while torque is transmitted from each hub 11 through teeth 16 and 17 to a cover sleeve 18. Torque is transmitted from one cover sleeve to the other solely through the projections 19 and the bolts 25 serve merely to hold the two sleeve sections in torque-transmitting relation to each other. No torque is transmitted through the casings 21, but these casings serve to protect the sleeve sections 18 as well as to prevent rupture of the sleeve sections by internal strains. In addition, the casing has an appearance as to the couplings which may have sales appeal.

The two hub members including the metal sleeve 10 and hub 11 are of identical shape and likewise the two sleeve sections 18 are of identical shape. The same mold may, therefore, be used for producing both sleeve sections and the same condition exists with respect to the hub members. The hub 11 may be molded directly on the sleeve 10. Therefore, both the hub members and sleeve sections may each be produced in a single molding operation. The fact that these members may be thus molded greatly reduces the labor cost involved in producing the flexible coupling and does away entirely with the extensive machining required in the manufacture of flexible couplings from forgings.

While each hub member has been shown as being composed of a metal sleeve surrounded by a hub of thermosetting plastic material, it is contemplated that the metal sleeve may be dispensed with and the hub formed entirely of thermosetting plastic material. In the case of the hub composed entirely of thermosetting plastic material, the keyway may be molded therein at the time the hub is produced. The hub members and the sleeve sections may be composed of any one of a number of thermosetting plastic materials having suitable characteristics such as the material known in the art as macerated resin-impregnated fibrous material. Many thermosetting plastics under stress have a lower modulus of elasticity than steel and any one of these materials may be utilized.

Lubrication of the bearing may be effected by the provision of a supply of standard lubricant such as is used in an all-metal gear coupling. In such event, the gasket 25 will serve to prevent escape of lubricant from the interior of the coupling either while in operation or at rest. It is contemplated, however, that powdered graphite may be mixed with the plastic material from which the coupling is composed so that the gear teeth may be self-lubricating in which event no supply of fluid lubricant will be required.

It is of course understood that various modifications may be made in the coupling above described without in any way departing from the spirit of the invention as defined in the appended claim.

I claim:

A gear type flexible coupling comprising a pair of hubs adapted to be mounted on a pair of shafts and being composed at least in part of thermosetting plastic material, a cover surrounding said hubs and consisting of a pair of sleeve sections composed of thermosetting plastic material and having interengageable portions for transmitting torque between said hubs, a flat metal ring seated in a recess at one end of each hub, a metal casing encircling each cover section and having an outwardly extending radial lip, said casing serving to hold said ring in its recess and having a portion forming a groove with said ring, an annular gasket received in said groove, means interconnecting said casings to maintain the interengaging portions of said hubs in torque-transmitting relationship, exterior rows of teeth on said hubs and interior rows of teeth on said cover sections co-operating with said hub teeth, both the hub teeth and cover teeth having contacting plastic material surfaces.

GEORGE A. DALTON.

REFERENCES CITED

The following references are of record in the file of this patent:

UNITED STATES PATENTS

| Number | Name | Date |
| --- | --- | --- |
| 1,160,364 | Baekeland | Nov. 16, 1915 |
| 1,896,070 | Cherry | Feb. 7, 1933 |
| 1,054,265 | Baekeland | Feb. 25, 1913 |
| 1,143,054 | Lloyd | June 15, 1915 |
| 1,980,933 | Simons | Nov. 13, 1934 |
| 1,983,007 | Simons | Dec. 4, 1934 |
| 2,271,060 | Case | Jan. 27, 1942 |
| 2,332,068 | Fast | Oct. 19, 1943 |
| 1,890,332 | Muller-Keuth | Dec. 6, 1932 |
| 1,435,141 | Serrell | Nov. 7, 1922 |

FOREIGN PATENTS

| Number | Country | Date |
| --- | --- | --- |
| 413,953 | Great Britain | July 26, 1934 |